(12) United States Patent
Walston et al.

(10) Patent No.: US 11,643,369 B2
(45) Date of Patent: May 9, 2023

(54) COOL SIDE COATING FOR CERAMIC OR CERAMIC MATRIX COMPOSITE ARTICLE

(71) Applicant: Rolls-Royce Corporation, Indianapolis, IN (US)

(72) Inventors: Jeffrey Allen Walston, Indianapolis, IN (US); Benjamin John Bowin Lai, Indianapolis, IN (US); Adam Lee Chamberlain, Mooresville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 650 days.

(21) Appl. No.: 16/570,749

(22) Filed: Sep. 13, 2019

(65) Prior Publication Data

US 2021/0078914 A1    Mar. 18, 2021

(51) Int. Cl.
| | |
|---|---|
| C04B 41/88 | (2006.01) |
| C04B 41/87 | (2006.01) |
| C04B 41/86 | (2006.01) |
| C04B 41/45 | (2006.01) |
| F01D 5/28 | (2006.01) |
| C04B 35/01 | (2006.01) |
| C04B 35/565 | (2006.01) |

(52) U.S. Cl.
CPC .............. *C04B 41/88* (2013.01); *C04B 35/01* (2013.01); *C04B 35/565* (2013.01); *C04B 41/4529* (2013.01); *C04B 41/4584* (2013.01); *C04B 41/86* (2013.01); *C04B 41/87* (2013.01); *F01D 5/282* (2013.01); *F01D 5/284* (2013.01); *F01D 5/288* (2013.01); *F05D 2300/6033* (2013.01); *Y10T 428/31504* (2015.04)

(58) Field of Classification Search
CPC ..... C04B 41/88; C04B 41/4584; C04B 41/86; C04B 41/87; C04B 41/52; C04B 35/565
See application file for complete search history.

(56) References Cited

U.S. PATENT DOCUMENTS

| | | | | |
|---|---|---|---|---|
| 7,090,894 | B2 * | 8/2006 | Carper | C04B 41/52 |
| | | | | 501/153 |
| 10,941,079 | B2 * | 3/2021 | Shim | F01D 5/284 |
| 2006/0128548 | A1 * | 6/2006 | Carper | C04B 41/009 |
| | | | | 501/17 |
| 2013/0177440 | A1 * | 7/2013 | Zhang | C04B 41/009 |
| | | | | 156/280 |
| 2017/0073277 | A1 * | 3/2017 | Shim | F01D 5/288 |

FOREIGN PATENT DOCUMENTS

JP    2006242887 A  *  9/2006  ............ G01M 19/00

* cited by examiner

*Primary Examiner* — Noah S Wiese
(74) *Attorney, Agent, or Firm* — Shumaker & Sieffert, P.A.

(57) ABSTRACT

An article may include a substrate including a ceramic or a ceramic matrix composite. The substrate defines a hot side surface configured to face a heated gas environment and a cool side surface opposite the hot side surface. The article also includes a cool side coating on the cool side surface. The cool side coating comprises at least one material having a flow temperature equal to or slightly less than a temperature of the heated gas environment.

20 Claims, 2 Drawing Sheets

COOL SIDE COATING FOR CERAMIC OR CERAMIC MATRIX COMPOSITE ARTICLE

TECHNICAL FIELD

The disclosure relates to ceramic or ceramic matric composite articles.

BACKGROUND

Ceramic or ceramic matrix composite (CMC) materials may be useful in a variety of contexts where mechanical and thermal properties are important. For example, components of high temperature mechanical systems, such as gas turbine engines, may be made from ceramic or CMC materials. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and reduce mechanical properties of the ceramic or CMC material, which may reduce the useful lifetime of the component. Thus, in some examples, a ceramic or CMC material may be coated with an environmental barrier coating, which may reduce exposure of the substrate to elements and compounds present in the operating environment of high temperature mechanical systems.

SUMMARY

In some examples, the disclosure describes an article that includes a substrate including a ceramic or a ceramic matrix composite. The substrate defines a hot side surface configured to face a heated gas environment and a cool side surface opposite the hot side surface. The article also includes a cool side coating on the cool side surface. The cool side coating comprises at least one material having a flow temperature equal to or slightly less than a temperature of the heated gas environment.

In some examples, a method may include forming a cool side coating on a cool side surface of a substrate comprising a ceramic or a ceramic matrix composite. The substrate defines a hot side surface configured to face a heated gas environment and the cool side surface. The cool side surface is opposite the hot side surface. The cool side coating includes at least one material having a flow temperature equal to or slightly less than a temperature of the heated gas environment.

The details of one or more examples are set forth in the accompanying drawings and the description below. Other features, objects, and advantages will be apparent from the description and drawings, and from the claims.

DETAILED DESCRIPTION

The disclosure describes articles that include a ceramic or ceramic matrix composite (CMC) substrate that includes a hot side and a cool side. The cool side of the ceramic or CMC substrate is coated with a cool side coating including at least one material configured to have a melting point equal to or slightly less than a temperature of the environment that the hot side faces. In response to damage to the CMC that extends through the substrate from the hot side to the cool side, the material layer is exposed to the environment that the hot side faces. This may result in the at least one material melting and flowing into the damage to reduce or eliminate an opening that extends through the substrate. This may reduce or substantially eliminate flow of hot gases from the environment to the cool side of the substrate and reduce further damage or performance loss of a system in which the substrate is used until the substrate can be replaced or repaired.

In some examples, the ceramic or CMC substrate may be part of a high temperature mechanical system, such as a gas turbine engine. For example, the ceramic or CMC substrate may be part of a vane, blade, liner, or the like, which includes an hot side surface exposed to hot gases flowing through the gas turbine engine and a cool side surface that faces away from the hot gases (e.g., into an internal cavity of a blade or vane). The hot gases may include water vapor, which, at the temperatures of the hot gases, may react with constituents of the ceramic or CMC substrate to cause recession. In some examples, the hot side surface of the ceramic or CMC substrate may be coated with an environmental barrier coating (EBC) to reduce or eliminate exposure of the ceramic or CMC substrate to the hot gases. However, if the EBC is damaged and exposes a portion of the ceramic or CMC substrate, recession of the ceramic or CMC substrate may occur. Should the recession proceed long enough without detection, the recession may form a channel or orifice through the ceramic or CMC substrate that extends from the hot side surface to the cool side surface. The material layer described herein, which is located on the cool side surface may act to at least partially close the channel or orifice.

Figure 1A:
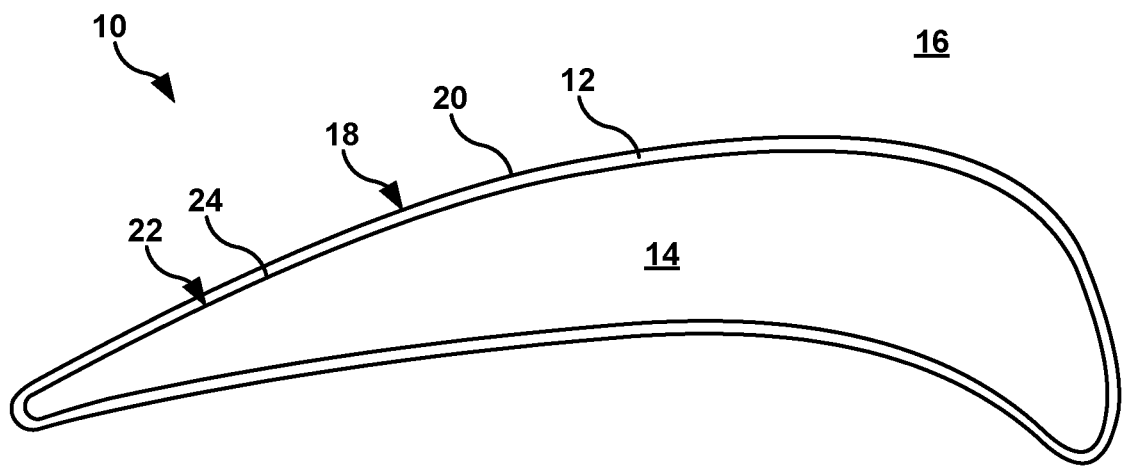
FIG. 1A is a conceptual and schematic diagram illustrating an example article that includes a ceramic or ceramic matrix composite substrate including a cool side coating.
Figure 1B:
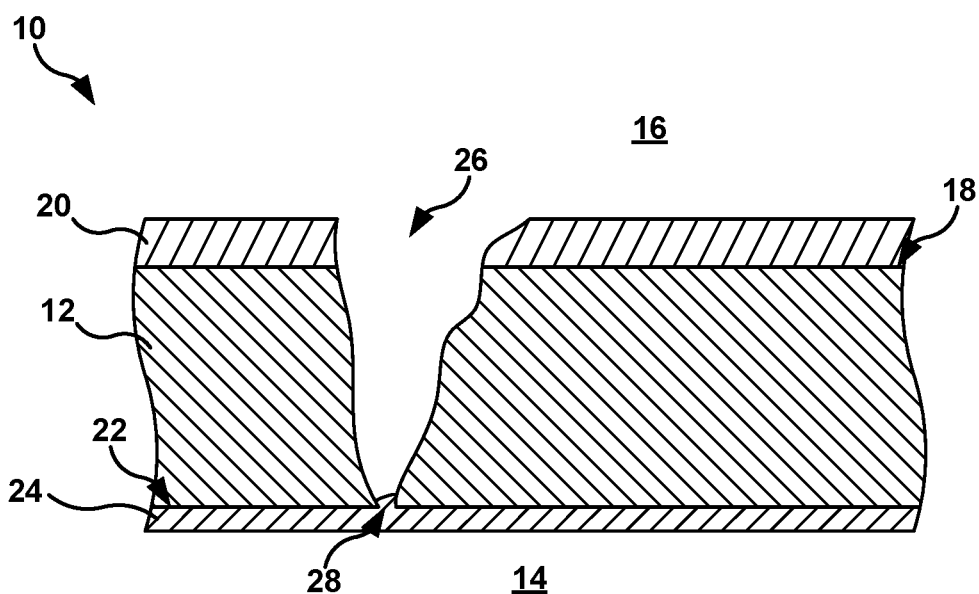
FIG. 1B is a conceptual and schematic diagram illustrating a portion of the example article of FIG. 1A.

FIG. 1A is a conceptual and schematic diagram illustrating an example article 10 that includes a ceramic or ceramic matrix composite substrate 12 including a cool side coating 24. FIG. 1B is a conceptual and schematic diagram illustrating a portion of the example article 10 of FIG. 1A.

In the example shown in FIGS. 1A and 1B, article 10 is or is part of an airfoil of a gas turbine engine. In other examples, article may be a different part of a gas turbine engine, such as a combustion chamber liner, a seal segment, a blade track, or the like, or may be a part of a different high temperature mechanical system. In general, substrate 12 of article 10 is configured to separate a heated gas environment 16 from a cool side environment 14.

Substrate 12 may include a material suitable for use in a high-temperature environment. For example, substrate 12 may include a ceramic or a ceramic matrix composite (CMC). Suitable ceramic materials, may include, for example, a silicon-containing ceramic, such as silica ($SiO_2$), silicon carbide (SiC), and/or silicon nitride ($Si_3N_4$); alumina ($Al_2O_3$); an aluminosilicate, such as mullite; a transition metal carbide (e.g., WC, $Mo_2C$, TiC); a silicide (e.g., $MoSi_2$, $NbSi_2$, $TiSi_2$); combinations thereof; or the like. In some examples in which substrate 12 includes a ceramic, the ceramic may be substantially homogeneous.

In examples in which substrate 12 includes a CMC, substrate 12 may include a matrix material and a reinforcement material. The matrix material may include, for example, silicon metal or a ceramic material, such as silicon carbide; silicon nitride; alumina; an aluminosilicate, such as mullite; silica ($SiO_2$); a transition metal carbide or silicide (e.g., WC, $Mo_2C$, TiC, $MoSi_2$, $NbSi_2$, $TiSi_2$); or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C); silicon carbide (SiC); silicon nitride ($Si_3N_4$); an aluminosilicate, such as mullite; silica ($SiO_2$); a transition metal carbide or silicide (e.g. WC, $Mo_2C$, TiC, $MoSi_2$, $NbSi_2$, $TiSi_2$); or the like. In some examples, the chemical composition of the matrix and the reinforcement may be the same (e.g., a SiC—SiC CMC). In other examples, the chemical composition of the matrix and the reinforcement may be different.

Substrate 12 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

In the example shown in FIGS. 1A and 1B, substrate 12 is part of an airfoil of a gas turbine engine. In other examples, substrate 12 may be a different part of a gas turbine engine, such as a combustion liner or the like, or may be a part of a different high temperature mechanical system. In general, substrate 12 is configured to separate heated gas environment 16 from cool side environment 14.

Substrate 12 defines a hot side surface 18 that faces heated gas environment 16 and a cool side surface 22 that faces cool side environment 14. Heated gas environment 16 may be, for example, a combustion environment or an environment that includes hot exhaust gases from a combustion reaction (e.g., a high-pressure turbine section of a gas turbine engine). Cool side environment 14 may include an environment that is relatively cooler that heated gas environment 16, such as an internal cavity of an airfoil, which may include a relatively cooler gas flowing within the cavity to help reduce a temperature of substrate 12 compared to heated gas environment 16. In some examples, cool side environment 14 may have a higher pressure than heated gas environment 16.

Hot side surface 18 may be coated with an environmental barrier coating (EBC) 20. EBC 20 may include an optional bond coat and an EBC layer. EBC 20 may help protect underlying substrate 12 from chemical species present in heated gas environment 16, such as, e.g., water vapor, calcia-magnesia-alumina-silicate (CMAS; a contaminant that may be present in intake gases of gas turbine engines), or the like. In the absence of EBC 20, some of the chemical species, such as water vapor, may react with materials in substrate 12 at the temperatures of heated gas environment 16, such as between about 1600° C. and about 2400° C. The reaction may cause recession of substrate 12 and eventually may result in a channel or orifice 26 forming in substrate 12 (as shown in FIG. 1B). EBC 20 helps protect against such chemical attack on substrate 12.

EBC 20 may include an optional bond coat on hot side surface 18 of substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, the optional bond coat may be directly on hot side surface 18 of substrate 12. In other examples, one or more coatings or layers of coatings may be between the bond coat and substrate 12.

The bond coat may increase the adhesion of the EBC layer to substrate 12. In some examples, the bond coat may include silicon metal (e.g., elemental silicon) and take the form of a silicon bond layer. In some examples, the bond coat may include silicon, a metal silicide, a rare earth monosilicate, a rare earth disilicate, hafnium silicate, mullite, SiC, a metal oxide, or a mixture thereof.

The composition of the optional bond coat may be selected based on the chemical composition and/or phase constitution of substrate 12 and the overlying EBC layer. For example, if substrate 12 includes a silicon-containing ceramic or a silicon-containing CMC, the bond coat may include silicon metal or alloy or a silicon-containing ceramic, such as, for example, mullite.

The optional bond coat may be applied on substrate 12 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

EBC 20 includes an EBC layer, which may be configured to help protect substrate 12 against deleterious environmental species, such as CMAS and/or water vapor. The EBC layer may include at least one of a rare-earth oxide, a rare-earth silicate, an aluminosilicate, or an alkaline earth aluminosilicate. For example, the EBC layer may include mullite, barium strontium aluminosilicate (BSAS), barium aluminosilicate (BAS), or strontium aluminosilicate (SAS). In some examples, the EBC layer may include at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

The EBC layer may further include an additive, such as at least one of alumina, silica, $TiO_2$, $Ta_2O_5$, $HfSiO_4$, an alkali oxide, or an alkali earth oxide. In some embodiments, the additive may be added to the EBC layer to modify one or more property of the EBC layer, such as CMAS resistance or the like.

The EBC layer may be formed on substrate 12 using any suitable technique, including, for example, thermal spraying, e.g., air plasma spraying, HVOF spraying, low vapor plasma spraying, suspension plasma spraying; PVD, e.g., EB-PVD, DVD, or cathodic arc deposition; CVD; slurry deposition; sol-gel process deposition; electrophoretic deposition; or the like.

Although EBC 20 provides protection to substrate 12 from environmental species such as water vapor or CMAS, EBC 20 may be damaged during use of article 10, e.g., due to foreign object damage (FOD). If EBC 20 is damaged and a portion of substrate 12 is exposed to heated gas environment 16, the hot gases, such as water vapor, may react with substrate 12, causing recession of substrate 12 and formation of a channel or orifice 26 in substrate 12. If the reaction continues, the channel or orifice 26 may extend from hot side surface 18 to cool side surface 22. This may allow hot gases to access cool side environment 14 and/or gases from cool side environment 14 to flow into heated gas environment 16. This may reduce efficiency of the system of which article 10 is a part, lead to further damage to substrate 12 and/or other parts of the system of which article 10 is a part, or the like.

In accordance with techniques of this disclosure, cool side surface 22 is coated with a cool side coating 24. Cool side coating 24 is configured to reduce a constrict or plug channel or orifice 26 at cool side surface 22 upon channel or orifice 26 extending to cool side surface 22.

For example, cool side coating 24 includes at least one material having a flow temperature equal to or slightly less than a temperature of heated gas environment 16. The at least one material may be the only material in cool side coating 24, or may be present in cool side coating 24 in combination with one or more other material that does not melt or flow at the temperature of heated gas environment 16.

The at least one material may have a flow temperature equal to or slightly less than (e.g., within 250° C. or 100° C. or 50° C. of) a temperature of heated gas environment 16. The flow temperature may be a melting temperature, a glass transition temperature, or the like, such that the at least one material has a viscosity at temperatures below the flow temperature that allow the at least one material to flow and has a viscosity at temperatures above the flow temperature that substantially prevent the at least one material from flowing. In some examples, the flow is assisted by the pressure difference between cool side environment 14 and heated gas environment 16. The at least one material may be selected such that the flow temperature is greater than a maximum operating temperature of cool side environment 14 to ensure that cool side coating 24 does not flow while substrate 12 is intact.

For example, the at least one material may include a metal or alloy that has a melting temperature that is equal to or slightly less than the temperature of heated gas environment 16. The metal or alloy may include silicon metal (e.g., elemental silicon); a silicon alloy, such as a Ta—Si, Zr—Si, or Hf—Si alloy including greater than about 90 atomic percent silicon; or the like. The melting temperature of silicon metal is about 1414° C. In response to being exposed to hot gases from heated gas environment 16 having a temperature greater than the melting temperature of the silicon metal or silicon alloy, the silicon metal or silicon alloy may melt and flow into the orifice created at cool side surface 22, reducing the size of the orifice or blocking the orifice, as shown by reference numeral 28 in FIG. 1B. The flowing of the melted silicon metal or alloy into the orifice may be assisted by a pressure difference between cool side environment 14 and heated gas environment 16. For example, cool side environment 14 may have a higher operating pressure than heated gas environment 16, which may urge the melted silicon metal or alloy to flow into the orifice.

In some examples, cool side coating 24 may additionally include at least one material that has a melting temperature greater than the temperature of heated gas environment 16. For example, the at least one material that has a melting temperature greater than the temperature of heated gas environment 16 may include a high-melt temperature ceramic. The at least one material that has a melting temperature greater than the temperature of heated gas environment 16 may be present in the form of fibers or particulates. The at least one material that has a melting temperature greater than the temperature of heated gas environment 16 may engage with surfaces of the orifice at cool side surface 22 to form a mechanical plug. The mechanical plug may slow flow of the at least one material that has a flow temperature equal to or slightly less than a temperature of heated gas environment 16 and help plug the orifice.

In some examples, the at least one material that has a melting temperature greater than the temperature of heated gas environment 16 may be in the form of fibers. Fibers may have a relatively high aspect ratio, which may encourage formation of the mechanical plug in the orifice at cool side surface 22. For example, the aspect ratio of a longest dimension of the fiber to an orthogonal dimension of the fiber may be between about 3 and about 50, and the longest dimension may be between about 50 micrometers and about 250 micrometers, such as between about 75 micrometers and about 200 micrometers.

In other examples, the at least one material that has a melting temperature greater than the temperature of heated gas environment 16 may be in the form of particulates. The particulates may have a diameter between about 0.5 micrometer and about 20 micrometers, such as between about 1 micrometer and about 10 micrometers. The diameter may be a number average diameter of the particulates.

The at least one material that has a melting temperature greater than the temperature of heated gas environment 16 may include any material with a suitable melting temperature. For example, the at least one material that has a melting temperature greater than the temperature of heated gas environment 16 may include silicon carbide, silicon nitride, alumina, mullite, an oxide-oxide ceramic, or the like.

A cool side coating 24 that includes a metal or alloy, alone, or in combination with at least one material that has a melting temperature greater than the temperature of heated gas environment 16 may have any suitable thickness. The thickness may be selected to provide sufficient material to reduce a size or plug the orifice at cool side surface 22, while being sufficiently thin that residual stress from coating formation is not so high that cool side coating 24 spall easily. For example, cool side coating 24 may define a thickness of greater than about 0.003 inches (about 76 micrometers) and/or a thickness less than about 0.008 inches (about 203 micrometers).

In some examples, rather than including a metal or alloy, the at least one material having a flow temperature equal to or slightly less than a temperature of heated gas environment 16 may include a glass. The glass may be in the form of a film or tape that is applied to cool side surface 22. The glass may be a silica-based glass. The composition of the glass may be selected so that the glass transition temperature is equal to or slightly less than the temperature of heated gas environment 16 and greater than a maximum operating temperature of cool side environment 14. For example, the glass may include a silica-based glass, including a borosilicate glass ($SiO_2$—$B_2O_3$), a silica and alkali metal oxide glass (e.g., $SiO_2$—$Na_2O$, $SiO_2$—$K_2O$, or $Li_2O$), a silica-phosphate glass (e.g., $SiO_2$—$P_2O_5$), or the like. By selecting the glass transition temperature in this range, as the orifice opens at cool side surface 22, the temperature increase in cool side coating 24 reduces the viscosity of the glass, allowing the glass to flow into the orifice. As the temperature of the glass increases further, above the glass transition temperature, the glass may crystallize, reducing or substantially eliminating further flow of the glass.

The thickness of the glass film or tape may be selected so that the tape or film is sufficiently flexible to substantially conform to cool side surface 22. For example, the thickness of the glass tape or film may be between about 25 micrometers and about 100 micrometers.

In this way, article 10 may include a cool side coating 24 that includes a composition configured to flow into any orifice that is formed in cool side surface 22, e.g., due to recession of substrate 12. Such a coating may extend a service life of article 10 and reduce or prevent damage to article 10 that renders article 10 unusable.

Figure 2:
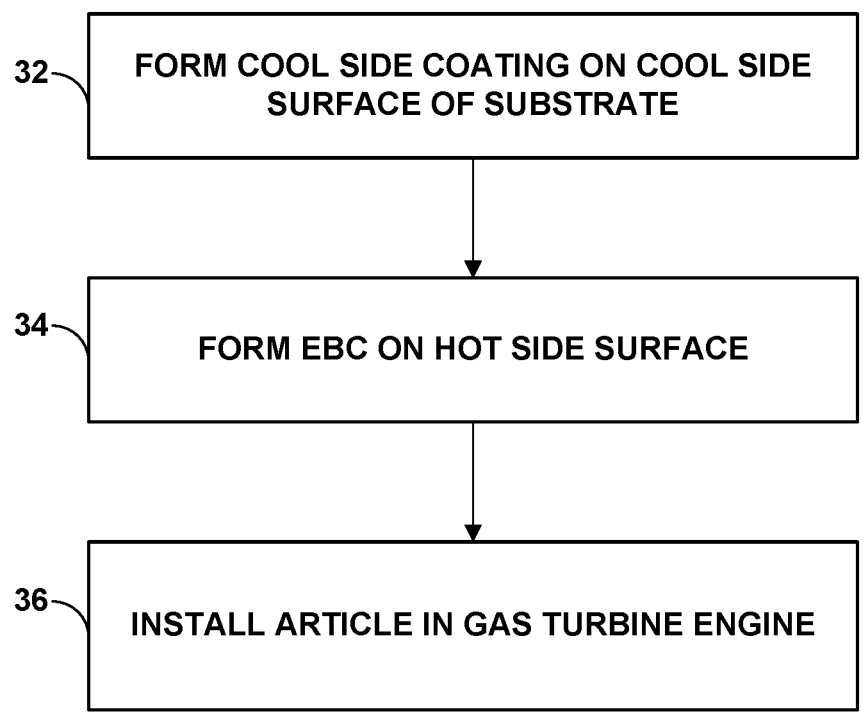
FIG. 2 is a flow diagram illustrating an example technique for forming an article in accordance with an example of the disclosure.

FIG. 2 is a flow diagram illustrating an example technique for forming an article 10 in accordance with an example of the disclosure. The technique of FIG. 2 will be described with reference to article 10 of FIG. 1. However, it will be understood that the technique of FIG. 2 may be used to form another article and that article 10 may be formed using other techniques.

The technique of FIG. 2 includes forming cool side coating 24 on cool side surface 22 of substrate 12 (32). Cool side coating 24 may be formed using any suitable technique. For example, in implementations in which cool side coating 24 includes a metal or alloy, cool side coating 24 may be formed using thermal spraying, e.g., air plasma spraying, HVOF spraying, low vapor plasma spraying, or suspension plasma spraying; PVD, e.g., EB-PVD, DVD, or cathodic arc deposition; CVD; slurry deposition; sol-gel process deposition; electrophoretic deposition; or the like. In implementations in which cool side coating 24 includes a glass tape or film, cool side coating 24 may be formed by first forming the glass tape or film, the adhering the glass tape or film to cool side surface 22, e.g., using a high temperature adhesive. Alternatively, the glass tape or film may be laid up as the innermost ply of a CMC prior to melt infiltration and the melt infiltration may adhere the glass tape or film to cool side surface 22.

The technique of FIG. 2 also optionally includes forming EBC 20 on hot side surface 18 (34). EBC 20 may include one or more layers, as described above. Each of the layers may be formed using, for example, thermal spraying, e.g., air plasma spraying, HVOF spraying, low vapor plasma spraying, or suspension plasma spraying; PVD, e.g., EB-PVD, DVD, or cathodic arc deposition; CVD; slurry deposition; sol-gel process deposition; electrophoretic deposition; or the like.

The technique of FIG. 2 also optionally includes installing article 10 in a gas turbine engine (36). For example, article 10 may be an airfoil, a combustion chamber liner, a seal segment, a blade track, or the like. By including cool side coating 24 that includes a composition configured to flow into any orifice that is formed in cool side surface 22, e.g., due to recession of substrate 12, article 10 may have an extended service life of article 10 compared to an article that does not include cool side coating 24.

Clause 1: An article including: a substrate comprising a ceramic or a ceramic matrix composite, wherein the substrate defines a hot side surface configured to face a heated gas environment and a cool side surface opposite the hot side surface; and a cool side coating on the cool side surface, wherein the cool side coating comprises at least one material having a flow temperature equal to or slightly less than a temperature of the heated gas environment.

Clause 2: The article of clause 1, wherein the at least one material comprises silicon metal or a silicon alloy.

Clause 3: The article of clause 2, wherein the cool side coating further comprises at least one material having a melting temperature greater than the temperature of the heated gas environment.

Clause 4: The article of clause 3, wherein the at least one material having the melting temperature greater than the temperature of the heated gas environment comprises fibers or particulates.

Clause 5: The article of clause 4, wherein the fibers or particulates comprise silicon carbide or an oxide-oxide ceramic.

Clause 6: The article of clause 4 or 5, wherein the at least one material having the melting temperature greater than the temperature of the heated gas environment comprises the fibers, and wherein the fibers have an aspect ratio between about 3 and about 50.

Clause 7: The article of clause 4 or 5, wherein the at least one material having the melting temperature greater than the temperature of the heated gas environment comprises the particulates, and wherein the particulates comprise a diameter between about 1 micrometer and about 10 micrometer.

Clause 8: The article of any one of clauses 1 to 7, wherein the flow temperature is a melting temperature of the at least one material.

Clause 9: The article of any one of clauses 1 to 7, wherein the at least one material comprises a glass, and wherein the flow temperature is a glass transition temperature of the glass.

Clause 10: The article of any one of clauses 1 to 9, wherein the flow temperature of the at least one material is greater than a maximum operating temperature of cool side environment that contacts the cool side coating.

Clause 11: The article of any one of clauses 1 to 10, further comprising an environmental barrier coating on the hot side surface.

Clause 12: The article of any one of clauses 1 to 11, wherein an operating pressure of a cool side environment that contacts the cool side coating is greater than an operating pressure of the heated gas environment.

Clause 13: The article of any one of clauses 1 to 12, wherein the substrate is an airfoil of a gas turbine engine.

Clause 14: A method including: forming a cool side coating on a cool side surface of a substrate comprising a ceramic or a ceramic matrix composite, wherein the substrate defines a hot side surface configured to face a heated gas environment and the cool side surface, wherein the cool side surface is opposite the hot side surface, and wherein the cool side coating comprises at least one material having a flow temperature equal to or slightly less than a temperature of the heated gas environment.

Clause 15: The method of clause 14, further comprising forming an environmental barrier coating on the hot side surface.

Clause 16: The method of clause 14 or 15, wherein the at least one material comprises silicon metal or a silicon alloy.

Clause 17: The method of clause 16, wherein the cool side coating further comprises at least one material having a melting temperature greater than the temperature of the heated gas environment.

Clause 18: The method of clause 17, wherein the at least one material having the melting temperature greater than the temperature of the heated gas environment comprises fibers or particulates.

Clause 19: The method of any one of clauses 14 to 18, wherein the flow temperature of the at least one material is greater than a maximum operating temperature of cool side environment that contacts the cool side coating.

Clause 20. The method of any one of clauses 14 to 19, further comprising installing the substrate in a gas turbine engine.

Various examples have been described. These and other examples are within the scope of the following claims.

What is claimed is:

1. An article comprising:
a substrate comprising a ceramic or a ceramic matrix composite, wherein the substrate defines a hot side surface configured to face a heated gas environment and a cool side surface opposite the hot side surface and configured to face a cool side environment;
a hot side coating on the hot side surface configured to maintain thermal stability in the heated gas environment; and
a cool side coating on the cool side surface opposite the hot side coating, wherein the cool side coating is an outermost coating layer on the cool side surface, and wherein the cool side coating comprises at least one material having a flow temperature equal to or slightly less than a temperature of the heated gas environment, wherein the at least one material comprises a glass, and wherein the flow temperature is a glass transition temperature of the glass.

2. The article of claim 1, wherein the at least one material comprises silicon metal or a silicon alloy.

3. The article of claim 2, wherein the cool side coating further comprises at least one material having a melting temperature greater than the temperature of the heated gas environment.

4. The article of claim 3, wherein the at least one material having the melting temperature greater than the temperature of the heated gas environment comprises fibers or particulates.

5. The article of claim 4, wherein the fibers or particulates comprise silicon carbide or an oxide-oxide ceramic.

6. The article of claim 4, wherein the at least one material having the melting temperature greater than the temperature of the heated gas environment comprises the fibers, and wherein the fibers have an aspect ratio between about 3 and about 50.

7. The article of claim 4, wherein the at least one material having the melting temperature greater than the temperature of the heated gas environment comprises the particulates, and wherein the particulates comprise a diameter between about 1 micrometer and about 10 micrometers.

8. The article of claim 1, wherein the flow temperature is a melting temperature of the at least one material.

9. The article of claim 1, wherein the flow temperature of the at least one material is greater than a maximum operating temperature of cool side environment that contacts the cool side coating.

10. The article of claim 1, wherein the hot side coating comprises an environmental barrier coating on the hot side surface.

11. The article of claim 1, wherein an operating pressure of a cool side environment that contacts the cool side coating is greater than an operating pressure of the heated gas environment.

12. The article of claim 1, wherein the substrate is an airfoil of a gas turbine engine.

13. The article of claim 1,
wherein the temperature of the heated gas environment is between about 1600° C. and about 2400° C., and
wherein the flow temperature of the at least one material of the cool side coating is equal to or within 250° C. less than the temperature of the heated gas environment.

14. An article comprising:
a substrate comprising a ceramic or a ceramic matrix composite, wherein the substrate defines a hot side surface configured to face a heated gas environment and a cool side surface opposite the hot side surface and configured to face a cool side environment;
a hot side coating on the hot side surface configured to maintain thermal stability in the heated gas environment; and
a cool side coating on the cool side surface opposite the hot side coating, wherein the cool side coating is an outermost coating layer on the cool side surface, and wherein the cool side coating comprises:
at least one material having a flow temperature equal to or slightly less than a temperature of the heated gas environment, wherein the at least one material comprises silicon metal or a silicon alloy; and
at least one material having a melting temperature greater than the temperature of the heated gas environment, wherein the at least one material comprises at least one of:
fibers having an aspect ratio between about 3 and about 50; or
particulates having a diameter between about 1 micrometer and about 10 micrometers.

15. A method comprising:
forming a hot side coating on a hot side surface of a substrate comprising a ceramic or ceramic matrix composite, wherein the substrate defines the hot side surface configured to face a heated gas environment and a cool side surface configured to face a cool side environment, wherein the cool side surface is opposite the hot side surface, and wherein the hot side coating is configured to maintain thermal stability in the heated gas environment; and
forming a cool side coating on the cool side surface opposite the hot side coating, wherein the cool side coating is an outermost coating layer on the cool side surface, and wherein the cool side coating comprises at least one material having a flow temperature equal to or slightly less than a temperature of the heated gas environment, wherein the at least one material comprises a glass, and wherein the flow temperature is a glass transition temperature of the glass.

16. The method of claim 15, wherein forming the hot side coating comprises forming an environmental barrier coating on the hot side surface.

17. The method of claim 15, wherein the at least one material comprises silicon metal or a silicon alloy.

18. The method of claim 17, wherein the cool side coating further comprises at least one material having a melting temperature greater than the temperature of the heated gas environment.

19. The method of claim 18, wherein the at least one material having the melting temperature greater than the temperature of the heated gas environment comprises fibers or particulates.

20. The method of claim 15, wherein the flow temperature of the at least one material is greater than a maximum operating temperature of cool side environment that contacts the cool side coating.

* * * * *